(12) United States Patent
Nagasawa

(10) Patent No.: US 6,356,952 B1
(45) Date of Patent: Mar. 12, 2002

(54) LOCAL AREA NETWORK HUB WITH DISTRIBUTED COMMUNICATION PORTS AND MAGNETICALLY ATTACHABLE BATTERY BOX

(75) Inventor: Kazuyoshi Nagasawa, Yokohama (JP)

(73) Assignee: Accton Technology Corporation, Hsinchu (TW)

( * ) Notice: Subject to any disclaimer, the term of this patent is extended or adjusted under 35 U.S.C. 154(b) by 0 days.

(21) Appl. No.: 09/285,836

(22) Filed: Apr. 2, 1999

(30) Foreign Application Priority Data

Oct. 14, 1998 (JP) .......................................... 10-292374

(51) Int. Cl.[7] .............................................. G06F 15/16
(52) U.S. Cl. ...................... 709/252; 709/250; 709/253; 710/100; 713/300
(58) Field of Search .......................... 709/200, 249–253; 710/100; 713/300, 340

(56) References Cited

U.S. PATENT DOCUMENTS

| | | | | |
|---|---|---|---|---|
| 5,887,132 A | * | 3/1999 | Leung et al. ............... | 709/200 |
| 5,990,577 A | * | 11/1999 | Kamioka et al. ............. | 307/26 |
| 6,076,117 A | * | 6/2000 | Billings ..................... | 709/253 |
| 6,132,242 A | * | 10/2000 | Hall et al. ................... | 439/532 |
| 6,138,185 A | * | 10/2000 | Nelson et al. ................ | 710/33 |
| 6,178,514 B1 | * | 1/2001 | Wood ......................... | 713/300 |

* cited by examiner

Primary Examiner—Zarni Maung
Assistant Examiner—Bharat Barot
(74) Attorney, Agent, or Firm—Rosenberg, Klein & Lee

(57) ABSTRACT

A computer hub includes a hub body and a battery box, the hub body having a plurality of connection ports at a plurality of peripheral sides thereof for the connection of signal lines from computers/servers to form a local area network, contact terminals at a bottom side wall thereof for receiving power supply from the battery box, and magnetic means for securing the hub body to the battery box or metal support means, the battery box having power terminals power supply output, and magnetic means for attracting the magnetic means to hold down the hub body, enabling the contact terminals of the hub body to be maintained in contact with the power terminals of the battery box.

1 Claim, 6 Drawing Sheets

LOCAL AREA NETWORK HUB WITH DISTRIBUTED COMMUNICATION PORTS AND MAGNETICALLY ATTACHABLE BATTERY BOX

BACKGROUND OF THE INVENTION

The present invention relates to a computer hub for use in a LAN (local area network), and more particularly to such a computer hub which has connection ports at its two opposite sides.

Twist pair type cables are most popularly used in front-end LANs for connection to desk-top personal computers for the advantage of being easy to be managed in cross linking means in a hub. IEEE802.3 defines 10BASE-T standards of transmission speed 10 Mb/s based on regular Ethernet's CSMA/CD (Carrier Sense Multiple Access with Collision Detection). A LAN of CSMA/CD design allows the user to add additional terminals or to change its layout freely, therefore the access procedure is easy, and the cost is low. In order to prevent net scale to be continuously extended and the total handling capability to be lowered due to increase of terminal number, the system architecture of using FDDI (fiber-distributed data interface) for the central LAN and cheaper 10BASE-T CSMA/CD for branch LANs has been gradually accepted. When building a 10BASE-T LAN, a hub is needed to connect all computers or servers together. Because the cables which are connected to the interface cards at the computers or servers are to be gathered to the hub, the hub must have a plurality of ports (normally, the number of sports is 4, 8, or 12) for receiving the cables. Because a hub has a circuit board in it for managing input/output information, power supply must be provided to the hub. When an AC adapter is used to provide power supply to a hub, the hub must have a power socket for receiving power supply from the AC adapter. If a hub is designed to receive city power supply directly, it must have an AC-DC converter on the inside (see Japanese Patent #6-311161, #8-204745). However, because regular hubs have connection ports at one side only, it is difficult to arrange the layout of the cables in a hub when the cables come from different directions. The arrangement of the layout may not be so difficult if sufficient installation space is available. However, it is inconvenient to arrange the cables in good order when the hub is installed in a narrow area. Further, notebook computers have become more and more popular nowadays for the advantage of high mobility. However, it is difficult to set up a LAN by connecting notebook computers to a hub at a place where there is no city power supply.

SUMMARY OF THE INVENTION

The present invention has been accomplished to provide a computer hub which eliminates the aforesaid problems. It is therefore the main object of the present invention to provide a computer hub which can be installed in a narrow space, enabling the connected cables to be arranged in good order. It is another object of the present invention to provide a computer hub which can be to battery power supply. According to one aspect of the present invention, the computer hub comprises a hub body having a plurality of connection ports at a plurality of peripheral sides thereof for the connection of signal lines from computers/servers. According to another aspect of the present invention, the connection ports are arranged at two opposite peripheral sides of the hub body. According to still another aspect of the present invention, the computer hub further comprises a battery box for connection to the hub body by a magnetic attraction force to provide battery power supply to the inside circuit board in the hub body, wherein the battery box comprises positive and negative power terminal means for power output, and magnetic means at one side wall thereof for fastening to the battery box; the hub body comprises positive and negative contact terminal means at one side wall thereof for contacting the positive and negative power terminal means at the battery box to receive battery power supply from the battery box, and magnetic means for attracting the magnetic means at the battery box to secure the hub body to the battery box and to keep the positive and negative contact terminal means in close contact with the positive and negative power terminal means.

DETAILED DESCRIPTION OF THE PREFERRED EMBODIMENT

A hub according to one embodiment of the present invention is generally comprised of a hub body having four connection ports at each of two opposite peripheral sides thereof for receiving signal lines from computers, and a battery box that can easily be fastened to the hub body by one-touch to provide the hub body with the necessary working voltage.

Figure 1:
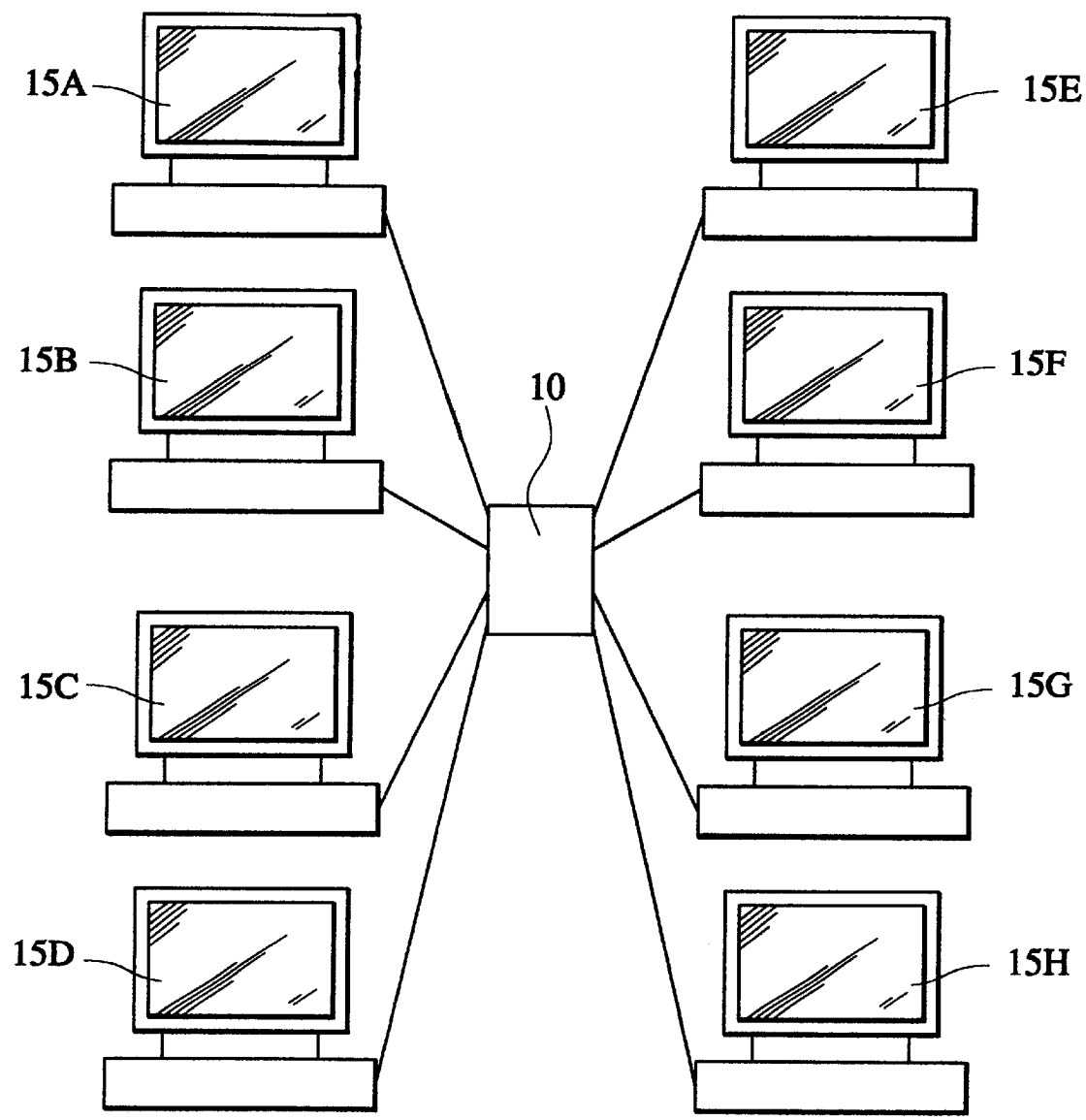
FIG. 1 is a schematic drawing showing the connection between a computer hub and computers according to the present invention.
Figure 2:
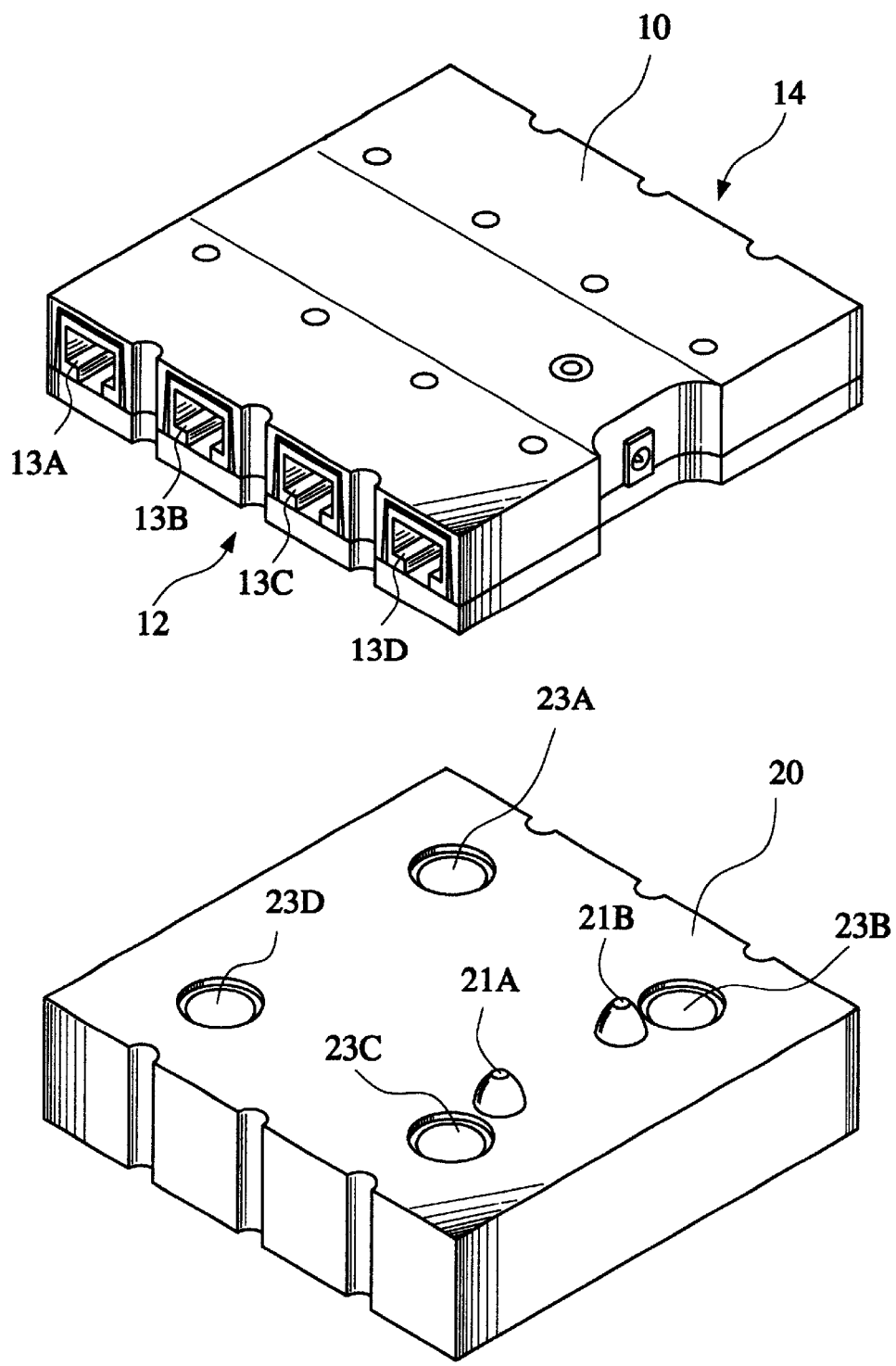
FIG. 2 illustrates a hub body and a battery box according to the present invention.
Figure 3A:
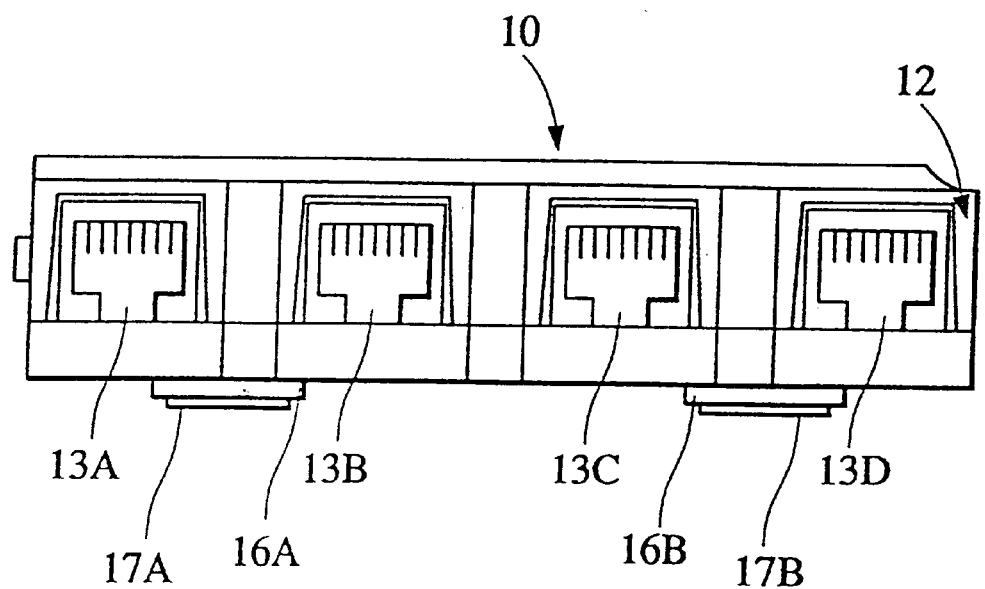
FIG. 3A is a left side view of the hub body according to the present invention.
Figure 3B:
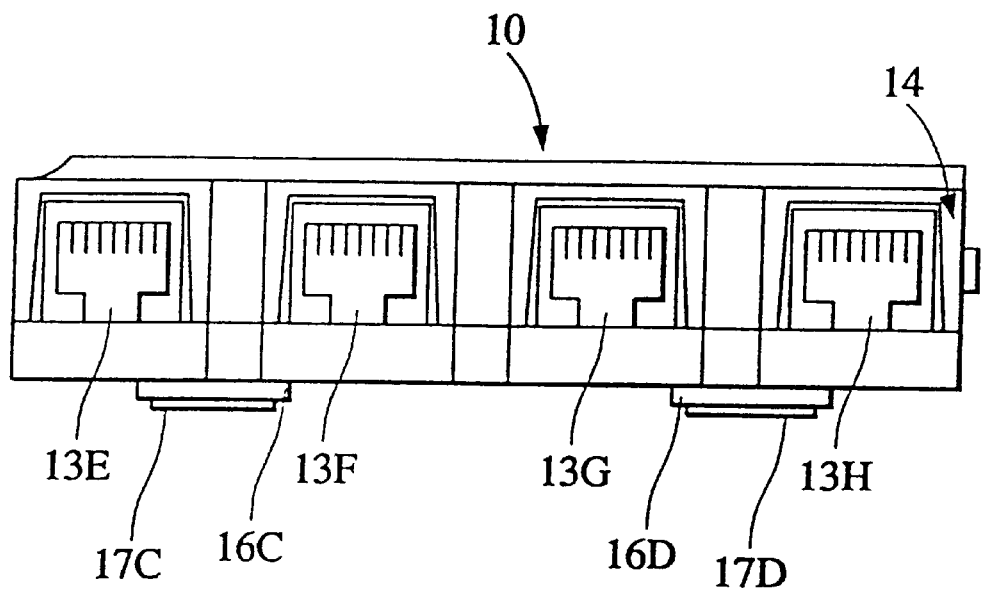
FIG. 3B is a right side view of the hub body according to the present invention.

Referring to FIG. 1, the hub body, referenced by 10, has four connection ports at each of two opposite peripheral sides thereof for the connection of the signal lines of computers, servers, and/or branch hubs. In FIG. 1, there are eight computers 15A~15H respectively connected to the connection ports of the hub body 10, forming a LAN (local area network).

Referring to FIGS. from 2 through 5, a battery box 20 is provided for connection to the hub body 10 to provide the hub body 10 with the necessary working voltage. The hub body 10 comprises four connection ports 13A~13D arranged in a line at a first peripheral side 12 thereof, and four connection ports 13E~13H arranged in a line at a second peripheral side 14 thereof opposite to the first peripheral side 12. Therefore, four computers can be connected to the hub body 10 at one side, i.e., the signal lines (cables) of the four computers can be respectively connected to the connection ports 13A~13D at the first peripheral side 12 of the hub body 10, or the connection ports 13E~13H at the second peripheral side 14 of the hub body 10. Individual rubber caps (not shown) may be used to close the connection ports 13A~13H when the hub body 10 is not in use.

The hub body 10 comprises a plurality of foot members 16A~16D at its bottom side, and magnets 17A~17D respectively securely mounted in the foot members 16A~16D at the bottom for enabling the hub body 10 to be secured to the battery box 20, or a metal furniture or support means.

As indicated above, the hub body 10 has two sets of connection ports 13A~13H at two opposite peripheral sides thereof for the connection of computers/servers/branch hubs, and magnets 17A~17D in foot members 16A~16D thereof for fastening to the battery box 20 or a metal furniture or support means. As an alternate form of the present invention, the connection ports 13A~13H may be provided at two adjacent peripheral sides, or three or more peripheral sides of the hub body 10.

Figure 4:
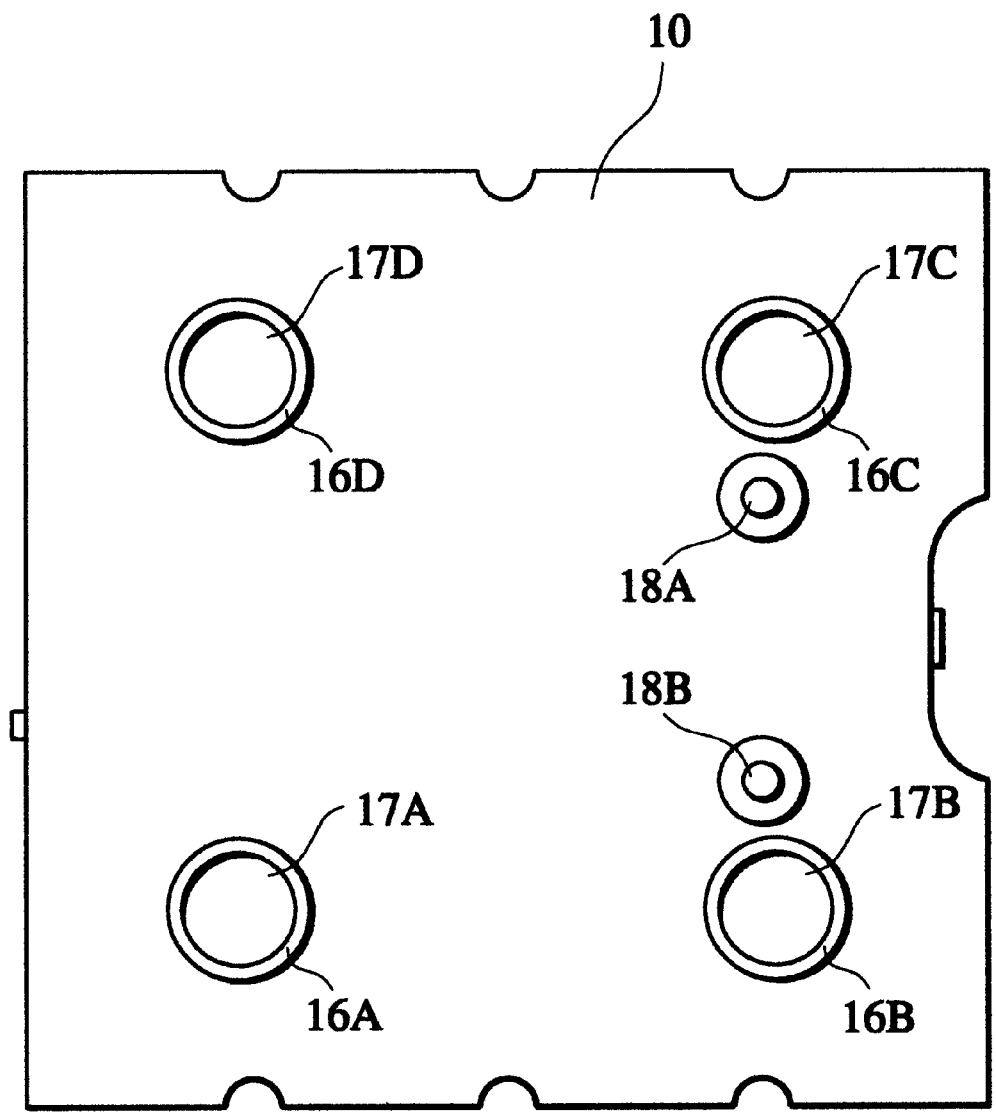
FIG. 4 is a bottom view of the hub body according to the present invention.
Figure 5:
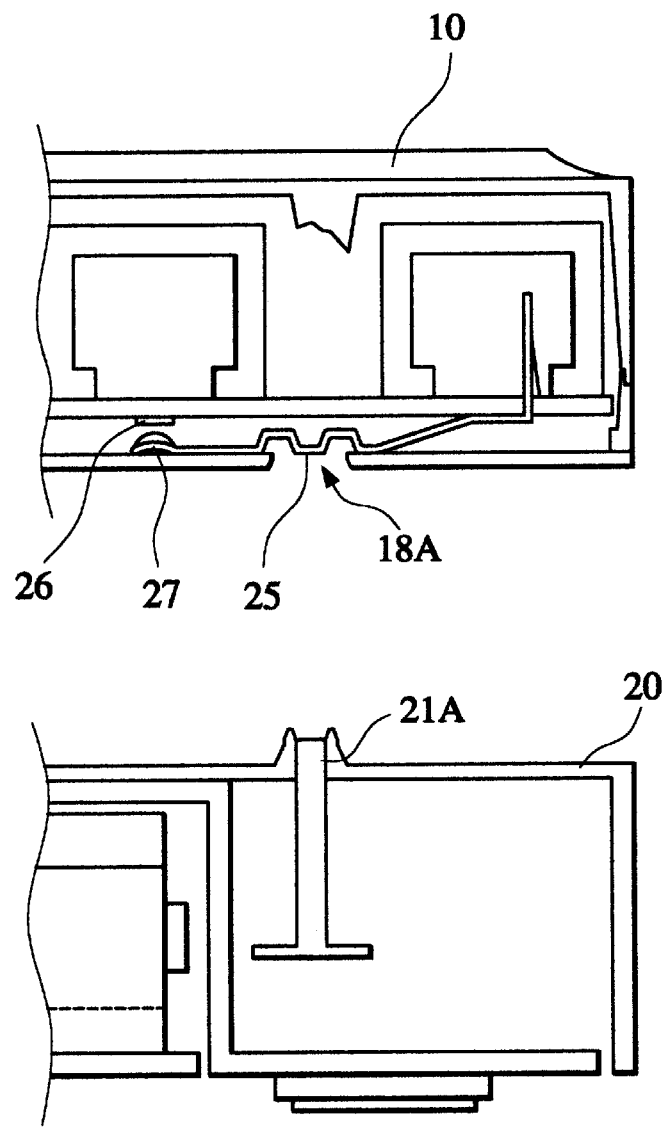
FIG. 5 is a sectional view of a part of the hub body and a part of the battery box according to the present invention.
Figure 6:
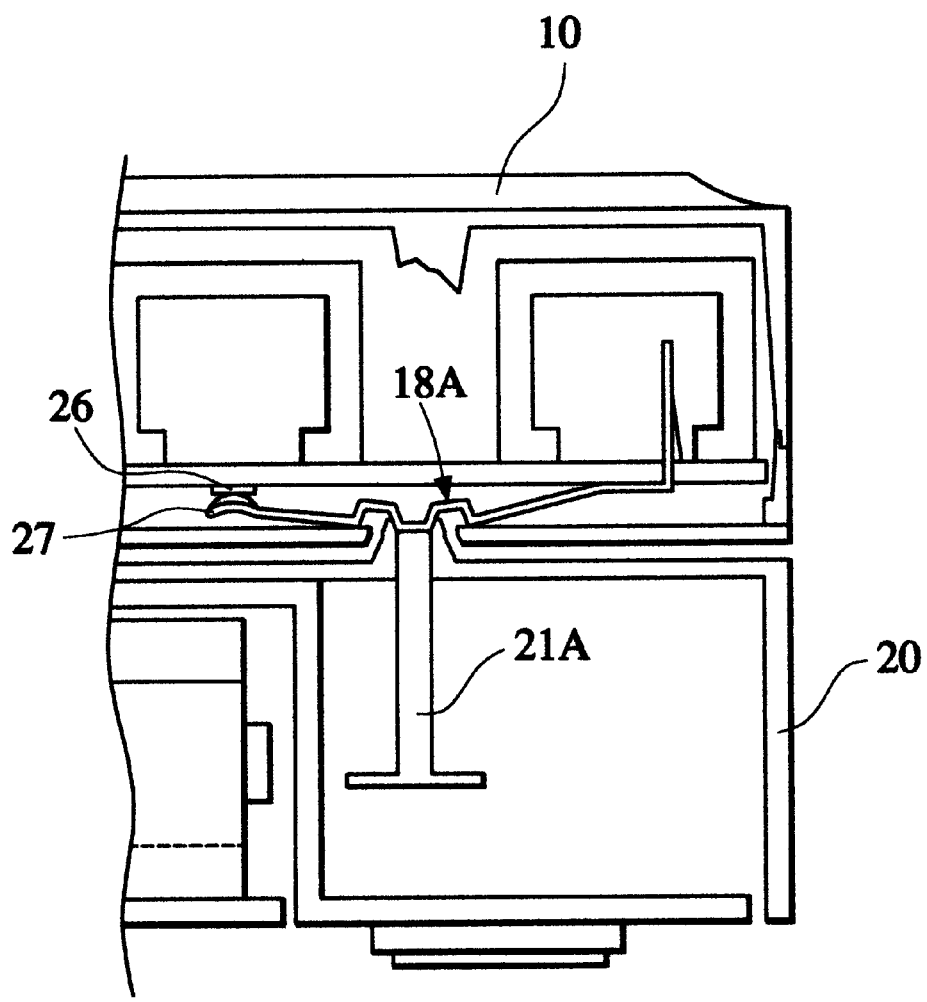
FIG. 6 shows the contact terminal of the hub body and the power terminal of the battery box attached together according to the present invention.

The hub body 10 further comprises two contact terminals 18A and 18B at its bottom side (see FIG. 4). The contact terminals 18A and 18B are respectively connected to the positive terminal and negative terminal of the power circuit of the circuit board inside the hub body 10.

The battery box 20 comprises two power terminals namely, the positive power terminal 21A and the negative power terminal 21B at its top side corresponding to the contact terminals 18A and 18B at the hub body 10, and a plurality of receiving holes 23A~23D at its top side for receiving the foot members 16A~16D of the hub body 10. Magnetic means (not shown) are provided inside the receiving holes 23A~23D to attract the magnets 17A~17D in the foot members 16A~16D.

The N pole and S pole of the magnets 17A~17D in the foot members 16A~16D and the polarity of the magnetic means in the receiving holes 23A~23D at the battery box 20 are so arranged that the magnetic means in the receiving holes 23A~23D at the battery box 20 attract the magnets 17A~17D in the foot members 16A~16D. When the foot members 16A~16D of the hub body 10 are inserted into the receiving holes 23A~23D at the battery box 20, the magnetic means in the receiving holes 23A~23D at the battery box 20 attract the magnets 17A~17D in the foot members 16A~16D, causing the hub body 10 to be secured to the battery box 20. When the hub body 10 and the battery box 20 are fastened together, the contact terminals 18A and 18B of the hub body 10 are retained in contact with the power terminals 21A and 21B at the battery box 20, enabling battery power supply to be connected to the circuit board in the hub body 10. Further, the battery box 20 has foot members and magnetic means in the foot members (not shown). Therefore, the battery box 20 can be secured to metal support means.

The contact terminal 18A (or 18B) is a metal spring leaf 25 mounted inside the hub body 10, having a fixed end securely fixed to an inside wall of the hub body 10, free end formed with a contact 27 and suspended below a contact 26 at the circuit board inside the hub body 10, and a protruded middle portion projecting out of a bottom hole at the bottom side of the hub body 10 for contacting the corresponding power terminal 21A (or 21B) at the battery box 20. The power terminal 21A (21B) is a metal spring leaf mounted inside the battery box 20, having a protruded middle portion projecting out of a top hole at the top side of the battery box 20 for contacting the corresponding contact terminal 18A (or 18B) at the hub body 10. The power terminals 21A and 21B are respectively connected to the two opposite terminals of the series of battery cells (4 pieces of #3 battery cells) in the battery box 20, Therefore, when the hub body 10 is fastened to the battery box 20, the contact terminals 18A and 18B of the hub body 10 are automatically maintained in close contact with the power terminals 21A and 21B of the battery box 20, enabling battery power to be connected to the circuit board in the hub body 10.

While only one embodiment of the present invention has been shown and described, it will be understood that various modifications and changes could be made thereunto without departing from the spirit and scope of the invention disclosed.

What the invention claimed is:

1. A computer hub for use in a local area network comprising:

a hub body enclosing a circuit board and having a top side, a bottom side, and a plurality of peripheral sides, wherein one side of said hub body includes a plurality of permanent magnets in a predetermined spatial arrangement and in a predetermined arrangement of magnetic poles and wherein one side of said hub body includes a plurality of electrical contact terminals in a predetermined spatial arrangement;

a plurality of network communication connection ports distributed in a predetermined spatial arrangement on said plurality of peripheral sides of said hub body;

a battery box enclosing a power supply for supplying electrical power to said circuit board enclosed in said hub body, wherein one side of said battery box includes a plurality of permanent magnets in a spatial arrangement corresponding to said predetermined spatial arrangement of said permanent magnets on said hub body and with an arrangement of magnetic poles opposite that of said predetermined arrangement of magnetic poles on said hub body and wherein one side of said battery box includes a plurality of electrical power terminals in a spatial arrangement corresponding to that of said predetermined spatial arrangement of said electrical contact terminals on said hub body; and, said battery box being attached to said hub body by magnetic attraction between said plurality of permanent magnets on said hub body and said plurality of permanent magnets on said battery box, whereby the attachment of said battery box to said hub body permits said electrical contact terminals of said hub body to engage with said electrical power terminals of said battery box.

* * * * *